(12) United States Patent
Lowery et al.

(10) Patent No.: US 9,002,210 B2
(45) Date of Patent: Apr. 7, 2015

(54) METHOD AND SYSTEM FOR NON-LINEARITY COMPENSATION IN OPTICAL TRANSMISSION SYSTEMS

(75) Inventors: Arthur James Lowery, Victoria (AU); Liang Bangyuan Du, Victoria (AU)

(73) Assignee: Ofidium Pty. Ltd., Melbourne, Victoria (AU)

( * ) Notice: Subject to any disclaimer, the term of this patent is extended or adjusted under 35 U.S.C. 154(b) by 314 days.

(21) Appl. No.: 13/582,510

(22) PCT Filed: Mar. 1, 2011

(86) PCT No.: PCT/AU2011/000219
§ 371 (c)(1),
(2), (4) Date: Nov. 15, 2012

(87) PCT Pub. No.: WO2011/106826
PCT Pub. Date: Sep. 9, 2011

(65) Prior Publication Data
US 2013/0156443 A1 Jun. 20, 2013

(30) Foreign Application Priority Data
Mar. 5, 2010 (AU) .............................. 2010900924

(51) Int. Cl.
*H04B 10/12* (2006.01)
*H04B 10/2507* (2013.01)
*H04B 10/69* (2013.01)

(52) U.S. Cl.
CPC ...... *H04B 10/25073* (2013.01); *H04B 10/6971* (2013.01)

(58) Field of Classification Search
CPC ...................... H04B 10/25073; H04B 10/6971
USPC ........................................................ 398/141
See application file for complete search history.

(56) References Cited

U.S. PATENT DOCUMENTS 5,860,936 A * 1/1999 Levin ............................ 600/558
7,899,416 B2 * 3/2011 McCallister et al. ...... 455/114.3
(Continued)

FOREIGN PATENT DOCUMENTS

WO   WO 2011/106826 A3   9/2011

OTHER PUBLICATIONS

Du et al., "Improved Single Channel Backpropagation for Intra-Channel Fiber Nonlinearity Compensation in Long-Haul Optical Communication Systems", Optics Express, Aug. 2010, 18(16), 17075-17088.
(Continued)

*Primary Examiner* — Ken Vanderpuye
*Assistant Examiner* — Abbas H Alagheband
(74) *Attorney, Agent, or Firm* — Baker & Hostetler LLP (57) ABSTRACT

An equalizer (200) for equalization of a signal transmitted via an optical fiber link from a transmitter to a corresponding receiver employs a backpropagation model (300) which comprises one or more sequential segments collectively representing an inverse fiber link. Each sequential segment comprises a linear backpropagation element (304), and a non-linear backpropagation element (306) having an associated compensation bandwidth (312). The equalizer (200) generates a distortion-mitigated signal by computing, for each sequential segment in turn, a first linear compensated signal from a signal input to the segment in accordance with the linear backpropagation element (304), and a non-linear compensated signal from the first linear compensated signal in accordance with the non-linear backpropagation element (306). Computation of the non-linear compensation signal comprises limiting a bandwidth of a compensation signal derived from the first linear compensated signal in accordance with the associated compensation bandwidth (312).

16 Claims, 5 Drawing Sheets

(56) References Cited

U.S. PATENT DOCUMENTS

| | | | |
|---|---|---|---|
| 8,204,389 B2* | 6/2012 | Li et al. | 398/208 |
| 8,244,787 B2* | 8/2012 | Principe et al. | 708/322 |
| 8,326,159 B2* | 12/2012 | Li et al. | 398/208 |
| 8,427,650 B2* | 4/2013 | Fleischer et al. | 356/457 |
| 8,433,192 B2* | 4/2013 | Frankel et al. | 398/16 |
| 8,488,927 B2* | 7/2013 | Moison et al. | 385/39 |
| 8,526,518 B2* | 9/2013 | Feigin et al. | 375/260 |
| 8,611,839 B2* | 12/2013 | Principe et al. | 455/214 |
| 8,774,313 B2* | 7/2014 | Dou et al. | 375/296 |
| 2003/0054788 A1* | 3/2003 | Sugar et al. | 455/323 |
| 2004/0052526 A1* | 3/2004 | Jones et al. | 398/50 |
| 2005/0069162 A1* | 3/2005 | Haykin et al. | 381/312 |
| 2006/0008279 A1* | 1/2006 | Chiang et al. | 398/202 |
| 2008/0159757 A1* | 7/2008 | Prat Goma et al. | 398/214 |
| 2008/0293372 A1* | 11/2008 | Principe et al. | 455/334 |
| 2009/0124218 A1* | 5/2009 | McCallister et al. | 455/114.2 |
| 2009/0201796 A1* | 8/2009 | Roberts et al. | 370/210 |
| 2010/0054759 A1* | 3/2010 | Oda et al. | 398/202 |
| 2010/0142943 A1* | 6/2010 | Frankel et al. | 398/25 |
| 2010/0165348 A1* | 7/2010 | Fleischer et al. | 356/458 |
| 2010/0247099 A1* | 9/2010 | Lowery et al. | 398/79 |
| 2010/0272208 A1* | 10/2010 | Feigin et al. | 375/268 |
| 2013/0236169 A1* | 9/2013 | Gaudette et al. | 398/25 |

OTHER PUBLICATIONS

Ezra et al., "Compensation of Dispersion and Nonlinear Impairments using Digital Backpropagation", Journal of Lightwave Technology, Oct. 15, 2008, 26(20), 3416-3425.

Oda et al., "112Gb/s DP-QPSK Transmission Using a Novel Nonlinear Compensator in Digital Coherent Receiver", OFC'09, Paper OThR6, 2009.

Tanimura et al., "Systematic Analysis on Mulit-Segment Dual-Polarisation Nonlinear Compensation in 112 Gb/s DP-QPSK Coherent Receiver", ECOC 2009, Sep. 20-24, 2009, Vienna Austria.

* cited by examiner

METHOD AND SYSTEM FOR NON-LINEARITY COMPENSATION IN OPTICAL TRANSMISSION SYSTEMS

CROSS-REFERENCE TO RELATED APPLICATIONS

This application is the National Stage of International Application No. PCT/AU2011/000219, filed Mar. 1, 2011, which claims the benefit of Australian Application No. 2010900924, filed Mar. 5, 2010, the disclosures of which are incorporated herein by reference in their entireties.

FIELD OF THE INVENTION

The present invention relates to the field of optical communications, and more particularly to methods and apparatus for performing electrical compensation of linear and non-linear impairments in coherent optical communications systems.

BACKGROUND OF THE INVENTION

Optical transmission, in which an information signal is modulated onto an optical carrier, is widely employed in modern communications systems. In particular, wide-area communications networks employ long-haul transmission links using single mode optical fibres for the transmission of digital information at very high bit rates, using one or more optical carriers, or wavelengths, over each fibre. The distance over which data may be transmitted in single mode optical fibres before some form of regeneration is required may be limited by optical attenuation, accumulated noise (eg from optical amplifiers), linear dispersion mechanisms, such as chromatic dispersion (CD) and polarisation mode dispersion (PMD), and non-linear processes, such as self phase modulation (SPM).

Recently, there has been considerable interest in coherent optical transmission technique, including coherent optical QPSK (CO-QPSK) and coherent optical OFDM (CO-OFDM) for next-generation long-haul transmission systems operating at bit rates of 100 gigabits per second or higher. Both of the aforementioned coherent optical modulation technologies may be employed to compensate for linear impairments such as CD and PMD, and thus fibre non-linearity is a significant limiting factor of transmission distance in such systems.

It is known that the linear and non-linear signal distortions may be completely reversed (in the absence of random noise processes) by propagating the distorted signal through a transmission span having characteristics that are precisely the inverse of the main transmission span. While such an "inverse span" does not exist in reality, it may be simulated using computational techniques applied to an inverse fibre model. Propagation through the inverse fibre model may be computed either at the transmitting end (in which case a pre-distorted signal is transmitted and the pre-distortion reversed in the transmission link) or at the receiver (in which case a distorted signal is detected, and propagation through the inverse model is simulated in order to recover the transmitted signal). The process of simulated propagation through an inverse model is referred to herein as "backpropagation".

While the backpropagation technique has been shown to be highly effective in mitigating the effects of both linear and non-linear distortion, it has the disadvantage of being highly computationally intensive. In particular, accurate backpropagation computation requires solution of the inverse non-linear Schrödinger Equation (NLSE), which governs the dispersive and non-linear propagation of the signal through the fibre link. Typically, the NLSE is solved numerically using the split-step Fourier method (SSFM), in which the fibre link is divided into a sequence of shorter segments, and propagation through each segment is simulated by computing separately the linear propagation, in the frequency domain, and the non-linear propagation, in the time domain. Thus each step involves two Fourier transforms, along with the multiplications required to implement the linear and non-linear phase shifts of the signal. Generally higher accuracy is achieved by using a smaller step size (ie segment length), and techniques are available to estimate the required step size in order to achieve a given level of desired accuracy.

In practice, it has been shown that for an optical transmission link comprising a plurality of fibre spans interconnected via optical amplifiers configured to compensate for transmission losses within each span, the step size for the split step method may be increased up to the span length with an acceptably small reduction in accuracy. This is because the effect of non-linear processes is essentially confined to the input end of each fibre span, at which the optical power is greatest. However, further reductions in the number of steps will result in significant loss of accuracy. Furthermore, digital computation of non-linear backpropagation requires at least three times oversampling of the signal, because the major non-linear effects in optical fibre transmission are of third order. Accordingly, it has been determined that the implementation of a backpropagation compensator for a transmission link including only 25 spans requires over 100 times the computational power of that required for linear equalisation only.

Accordingly, there is a need for computational methods, and corresponding apparatus, that are able to perform linear and non-linear equalisation of optical signals transmitted over long multi-span transmission links that requires significantly reduced computational resources compared to prior art techniques.

SUMMARY OF THE INVENTION

In one aspect, the present invention provides a method for equalisation of a signal to mitigate distortions of the signal in traversing an optical fibre link from an optical transmitter to a corresponding optical receiver, the method comprising:

providing a computational backpropagation model of the optical fibre link, said model comprising one or more sequential segments of the fibre link, wherein an initial segment is associated with the receiver and a final segment is associated with the transmitter, wherein each segment is modelled as at least a first linear backpropagation element and a non-linear backpropagation element having an associated compensation bandwidth;

applying the computational backpropagation model to the signal to generate a distortion-mitigated signal by computing, for each sequential segment in turn, a first linear compensated signal from a signal input to the segment in accordance with the first linear backpropagation element, and a non-linear compensated signal from the first linear compensated signal in accordance with the non-linear backpropagation element, wherein computation of the non-linear compensated signal comprises limiting a bandwidth of a compensation signal derived from the first linear compensated signal in accordance with the associated compensation bandwidth; and outputting the distortion-mitigated signal.

Embodiments of the present invention have a number of advantages over prior art backpropagation compensation techniques. These advantages stem primarily from the use of a bandwidth-limiting element, such as a low pass filter, within the non-linear backpropagation elements of each segment of the link model. The bandwidth limitation is justified by the fact that the widely-spaced optical spectral components contributing to high-frequency fluctuations, including components of the signal itself as well as those generated by third order non-linear processes, experience a high degree of walk-off in long dispersive transmission spans. This results in poor phase matching, and the suppression of non-linear mixing between such widely spaced components. Limiting the non-linear compensation bandwidth may therefore have a minimal impact on the accuracy of the backpropagation computation. The inventors have demonstrated that, as a result, the level of oversampling required may be reduced from the three times oversampling required in conventional techniques to well under two times oversampling. Additionally, it has been demonstrated that in embodiments of the invention in which the parameters of the backpropagation model are suitably optimised, the number of segments in the model may be reduced, such that each segment encompasses multiple spans, and that the overall computation cost can be reduced by a factor of 10 or more, as compared with prior art techniques.

Embodiments of the equalisation method may be used either for pre-equalisation or post-equalisation of transmitted signals. In a pre-equalisation embodiments, the input to the initial segment of the model is an undistorted signal, such that the resulting distortion-mitigated signal is transmitted through the fibre link, wherein the original signal is substantially regenerated. In a post-equalisation embodiment, the input to the initial segment of the model is a received distorted signal, such that the distortion-mitigated signal is substantially a reproduction of a corresponding transmitted signal.

In preferred embodiments, the backpropagation elements in each segment are characterised, at least in part, by parameters representing inverse propagation characteristics of a corresponding segment of the optical fibre link. In particular, linear backpropagation elements may have parameters, such as attenuation/gain, and dispersion, that are equal in magnitude and opposite in sign to the corresponding parameters in the actual transmission link. Similarly, the non-linear backpropagation elements may be characterised, at least in part, by a non-linear coefficient that is opposite in sign to that of the corresponding segment of the actual transmission link. In a practical implementation, one or more of the parameters of each backpropagation element may be approximated, estimated and/or optimised via online measurements.

More specifically, in a preferred embodiment the parameters of each linear element comprise an inverse dispersion parameter which is substantially equal in magnitude and opposite in sign to a corresponding dispersion parameter of the associated segment of the fibre link, and a length parameter that is substantially equal to a length of the associated segment of the fibre link. Preferably the parameters of each non-linear element comprise an inverse non-linear coefficient which is substantially equal in magnitude and opposite in sign to a corresponding non-linear coefficient of the associated segment of the fibre link, and an effective length parameter that is less than a length of the associated segment of the fibre link. It will be appreciated, however, that alternative implementations are possible, such as, for example, non-linear elements that are characterised by an inverse non-linear coefficient, a length parameter that is equal to the length of the associated link segment, and an additional "free" scaling parameter that is used to optimise non-linear compensation.

In yet another alternative implementation, backpropagation may be simulated by using a fibre model having parameters corresponding directly with those of the transmission fibre, rather than employing inverse parameters, and instead simulating the propagation of an "inverse signal" comprising a spectrally-inverted version of the input to the model. Embodiments employing all such variations, which result in practice in equivalent backpropagation simulation results, will be understood as falling within the scope of the invention.

Preferably, one or more of the parameters of the linear and non-linear elements are optimised in order to maximise a measure of post equalisation signal quality. This may be done, for example, via online measurement using transmitted training sequences of known information bits, and/or by simulation of the optical link and backpropagation model. Parameters that may be optimised in this manner include: inverse linear dispersion parameters; inverse non-linear coefficients and/or effective length parameters; number of steps/segments; and/or the compensation bandwidth of each non-linear backpropagation element.

Preferably, computing the first linear compensated signal comprises:

computing a Fourier transform of the signal input to the segment to produce a transformed input signal;

applying a frequency-dependent phase shift to the transformed signal to produce a transformed output signal; and computing an inverse Fourier transform of the transformed output signal to produce the first linear compensated signal.

Preferably, computing the non-linear compensated signal comprises:

computing a phase shift function comprising a filtered intensity dependent function of the first linearly compensated signal, wherein a bandwidth of said filtering corresponds with the associated compensation bandwidth; and applying a time dependent phase shift to the first linearly compensated signal in accordance with the phase shift function, to produce the non-linear compensated signal.

In a preferred embodiment, each segment model further includes a second linear backpropagation element, wherein the first and second linear backpropagation elements correspond with first and second continuous sub-segments of the associated segment of the fibre link, the sum of the lengths of said first and second sub-segments being equal to the length of the associated segment, and the relative length of each of said first and second sub-segments being determined so as to substantially maximise a degree of mitigation of signal distortion. The relative lengths of the first and second sub-segments may comprise a parameter of an appropriate optimisation step.

In another aspect, the invention provides an equaliser for equalisation of a signal transmitted via an optical fibre link from a transmitter to a corresponding receiver, the equaliser comprising:

a digital signal processor; and at least one memory device operatively associated with the digital signal processor, wherein:

the memory device contains information defining a backpropagation model of the optical fibre link, said backpropagation model comprising one or more sequential segments of the fibre link, wherein an initial segment is associated with the receiver and a final segment is associated with the transmitter, wherein each segment is modelled as at least a first linear backpropagation element and a non-linear backpropagation element having an associated compensation bandwidth; and the digital signal processor is configured to receive a sequence of input digital samples having a predetermined precision and sampling rate, and to generate a distortion-mitigated sequence of output digital samples from the input digital samples by computing, for each sequential segment in turn, a first linear compensated signal from a signal input to the segment in accordance with the first linear backpropagation element, and a non-linear compensated signal from the first linear compensated signal in accordance with the non-linear backpropagation element, wherein computation of the non-linear compensation signal comprises limiting a bandwidth of a compensation signal derived from the first linear compensated signal in accordance with the associated compensation bandwidth.

In various embodiments of the invention the digital signal processor may comprise a general purpose microprocessor and/or a dedicated digital signal processor integrated circuit, in combination with appropriate programming. Program instructions for the processor may be stored within the at least one memory device, or another memory device. The digital signal processor may, alternatively or additionally, include custom, semi-custom or programmable integrated circuit elements configured to perform specific digital computation functions. All such implementations of the digital signal processor and combinations thereof, fall within the scope of the present invention.

The digital signal processor may be further configured, eg via appropriate programming, to initialise the backpropagation model of the optical fibre link, for example by setting, estimating and/or optimising the various parameters of each element of the model.

In preferred embodiments, each segment model stored within the memory device further includes a second linear backpropagation element wherein the first and second linear backpropagation elements correspond with first and second continuous sub-segments of the associated segment of the fibre link, the sum of the lengths of said first and second sub-segments being equal to the length of the associated segment, and the relative length of each of said first and second sub-segments being determined so as to substantially maximise a degree of mitigation of signal distortion.

In some embodiments, the equaliser may be incorporated into a receiving apparatus comprising:

a coherent optical receiver for converting the optical signal to a corresponding received electrical signal; and at least one analogue to digital converter for converting the received electrical signal to a corresponding sequence of input digital samples having a predetermined precision and sampling rate, which are provided to the digital signal processor.

In other embodiments, the equaliser may be incorporated into a transmitting apparatus comprising:

a signal source generating a sequence of input digital samples having a predetermined precision and sampling rate, which are provided to the digital signal processor;

at least one digital to analogue converter for converting the distortion-mitigated sequence of output digital samples to a corresponding transmitted electrical signal; and an optical transmitter configured to modulate the transmitted electrical signal onto an optical carrier.

Further benefits, advantages and preferred features of the method and apparatus of the present invention will become apparent in the following description of preferred embodiment of the invention, which should not be considered to be limiting of the scope of the invention as disclosed in the preceding statements and defined in the claims appended hereto.

BRIEF DESCRIPTION OF THE DRAWINGS

Preferred embodiments of the invention are described with reference to the accompanying drawings, in which like reference numerals refer to like features, and wherein.

DETAILED DESCRIPTION OF PREFERRED EMBODIMENTS

Embodiments of the present invention provide methods and apparatus for equalisation of signals within optical transmission systems that are subject to a combination of linear and non-linear transmission effects, including chromatic dispersion (CD), polarisation mode dispersion (PMD), and self phase modulation (SPM). More particularly, equalisers are provided to mitigate distortions of the signal resulting from such effects, that are based generally upon the backpropagation technique, with novel modifications providing improved computational efficiency and/or accuracy. Backpropagation equalisers embodying the invention may be deployed at either the transmitting or receiving end of an optical transmission link, and while both of these variants are described generally herein, detailed characterisations and results are presented with particular reference to a post-equalisation embodiment, ie in which the backpropagation equaliser is deployed at the receiving end. It will be understood that the presentation of additional detail in relation to this specific embodiment does not imply any limitation to the generality of the invention, as broadly described herein, and defined by the appended claims.

Figure 1A:
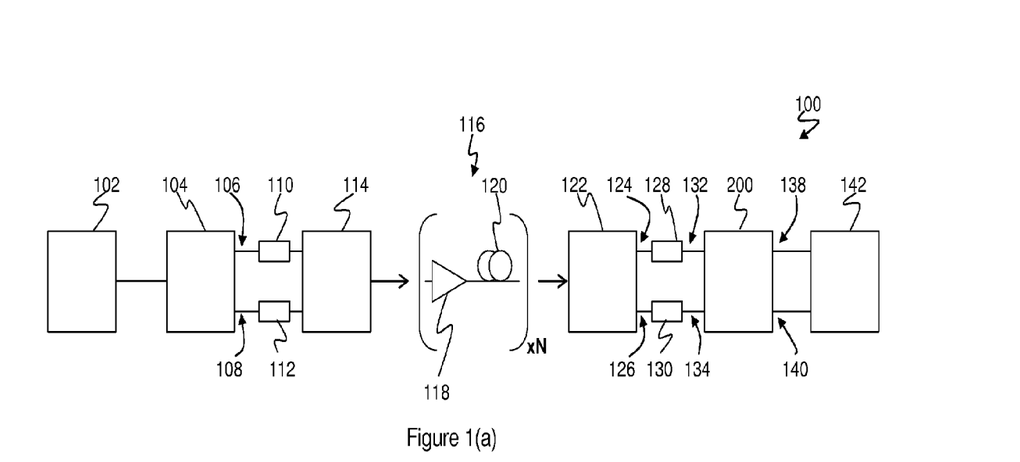
FIGS. 1(a) and 1(b) are block diagrams showing two alternative embodiments of an equalised optical fibre transmission link in accordance with the invention.

FIG. 1(a) depicts an optical transmission link 100 in which a backpropagation equaliser 200 is deployed at a receiving end. A data source 102 provides digital information, for example having a bit rate of 100 gigabits per second, intended for transmission via the optical link 100. The digital information is encoded by an encoder 104 to produce, in general, two sequences of digital signal samples 106, 108 corresponding with two possible orthogonal polarisation states of the transmitted optical signal. In accordance with preferred embodiments, the encoding performed by the encoder 104 is in accordance with either a quadrature phase shift keying (QPSK) or an orthogonal frequency division multiplexing (OFDM) modulation scheme, although other modulation schemes may be employed. The encoded sample sequences 106, 108 generally comprise complex-valued digital signal samples, representing in phase and quadrature components of the signals to be transmitted on the orthogonal polarisation states of an optical carrier.

Suitable digital to analogue conversion (DAC) blocks 110, 112 convert the respective sample sequences 106, 108 into corresponding time varying electrical signals that are modulated onto an optical carrier using a coherent optical transmitter 114. For complex-valued sample sequences 106, 108, each DAC block 110, 112 may comprise a pair of DAC's (for conversion of the real and imaginary components respectively), and the transmitter 114 may further include suitable RF components and/or a complex optical modulator configured to modulate the resulting electrical signals onto the optical carrier as corresponding in-phase and quadrature components.

An optical fibre transmission link 116 comprises a plurality (N) of fibre spans, each of which includes an optical amplifier 118 and a length of single mode optical fibre 120. In accordance with embodiments described herein, the optical amplifier 118 in each span has a gain determined so as to compensate for the corresponding attenuation within each length of fibre 120, such that the launch power into each span is a constant across the link 116.

Within the optical fibre transmission link 116, the transmitted signal is subject to distortions resulting from linear effects (eg CD and PMD) and non-linear effects (eg SPM).

The signal output from the transmission link 116 is received using a coherent optical receiver 122. In a preferred embodiment, the coherent receiver 122 comprises an optical local oscillator, an optical hybrid, and two sets of balanced detectors enabling electrical waveforms corresponding with two received polarisation states 124, 126 to be recovered. Notably, due to the effects of PMD in the transmission link 116, each of the two received polarisation signals 124, 126 generally comprises a (frequency dependent) linear combination of the signals in the two transmitted polarisation states.

Figure 4A:
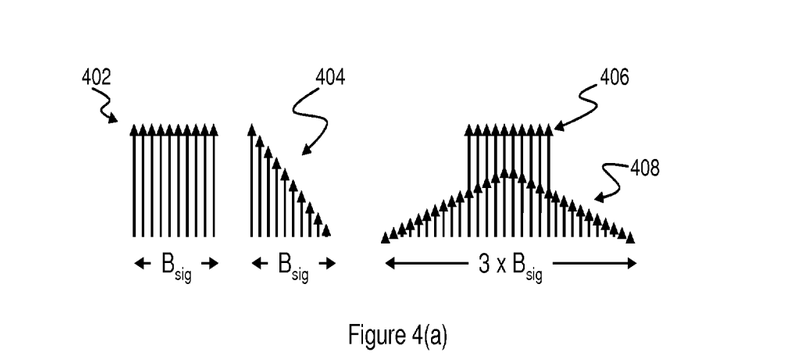
FIGS. 4(a) and 4(b) are schematic spectral diagrams illustrating a reduction in oversampling for implementation of a backpropagation equaliser according to an embodiment of the invention.
Figure 4B:
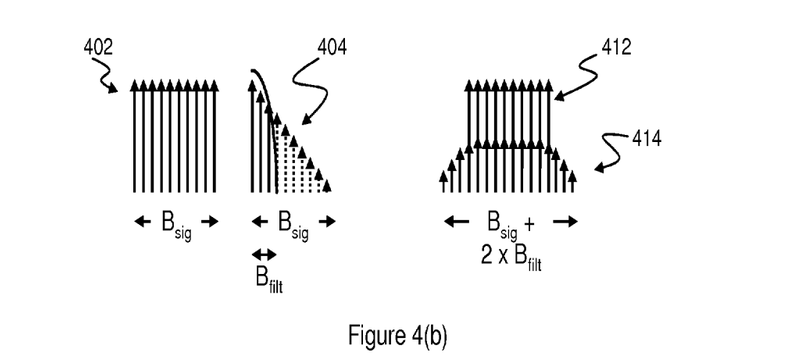

The received electrical signals 124, 126 are converted via analogue to digital converter (ADC) blocks 128, 130 into corresponding sample sequences 132, 134. It should be noted that for signals transmitted using both in-phase and quadrature components of the optical carrier, each signal path 124, 126 represents both components, and accordingly each ADC block 128, 130 may comprise a corresponding pair of ADC's, producing complex-valued outputs 132, 134. In general, oversampling is required in the ADC blocks 128, 130, in the sense that the sampling rate exceeds the Nyquist frequency corresponding with the bandwidth of the transmitted signals. Oversampling enables all of the signal synchronisation, equalisation and decoding to be performed within the digital domain, ie the ADC blocks 128, 130 are not required to perform synchronous sampling. For the case of linear equalisation only, a typical optical OFDM system employs an oversampling factor of 1.2, whereas an optical QPSK system may employ an oversampling factor of 2.0. As described in greater detail below, with reference to FIGS. 4(*a*) and 4(*b*), conventional backpropagation equalisation requires the use of an oversampling factor of at least 3.0, and it is one advantageous feature of embodiments of the present invention that this "excess" oversampling may be reduced or avoided, so as to reduce the computational burden associated with equalisation.

The sample sequences 132, 134 are input to backpropagation equaliser 200, which mitigates the combined linear and non-linear distortions in a manner described in greater detail below, with reference to FIGS. 2 to 6. The resulting equalised output digital sample sequences 138, 140 are input to a decoder 142 (ie either an OFDM or QPSK decoder/demodulator), in order to recover the originally transmitted data.

Figure 1B:
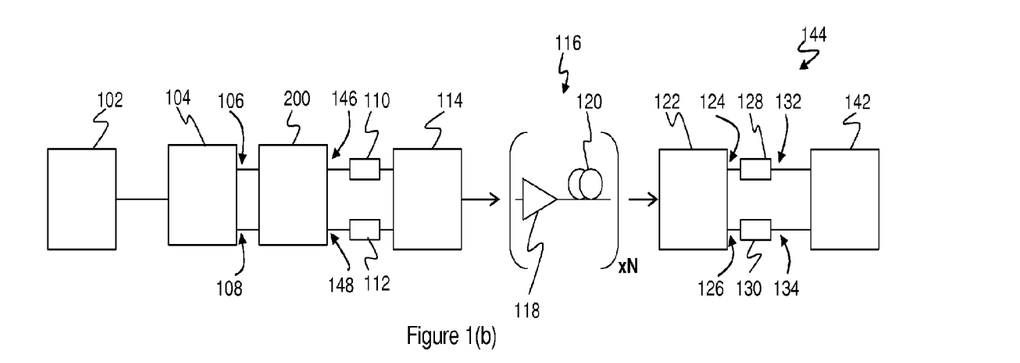

FIG. 1(*b*) depicts an alternative embodiment of the optical transmission system 144, in which the backpropagation equaliser 200 is deployed at the transmitting end. In this embodiment, the encoded signal sequences 106, 108 are input to the backpropagation equaliser 200, to produce corresponding pre-equalised sequences 146, 148. The principle of operation of the second embodiment 144 is analogous to that of the first embodiment 100. In particular, in the first embodiment 100 a transmitted signal is propagated through the fibre link 116, in which linear and non-linear distortion occurs, and then computationally backpropogated through an inverse link model by the backpropagation equaliser 200, in order to reverse the distortion effects. Conversely, in the second embodiment 144 the signal is effectively backpropagated through an inverse link model by the backpropagation equaliser 200 prior to transmission, and the "reverse" distortions introduced thereby are effectively undone during propagation through the fibre link 116.

In theory, the two embodiments 100, 144 should achieve identical performance. In practice, system constraints and non-ideal transmission characteristics result in different potential design and optimisation considerations for each embodiment. For example, a post equalisation embodiment 100 has the benefit that it may be possible to estimate characteristics of the transmission link 116, and accordingly estimate and/or optimise parameters of the backpropagation model, based solely upon the received signal, without the requirement for a feedback path to the transmitter. On the other hand, the pre-equalisation embodiment 144 has the benefit that the backpropagation equaliser 200 receives a noise free input 106, 108, which may produce more effective equalisation results. By contrast, the inputs 132, 134 to the equaliser 200 in the post equalisation embodiment 100 are effected by random transmission noise, such as amplified spontaneous emission (ASE) noise from the amplifiers 118, which cannot be reversed, and which may therefore lead to less effective equalisation.

Figure 2:
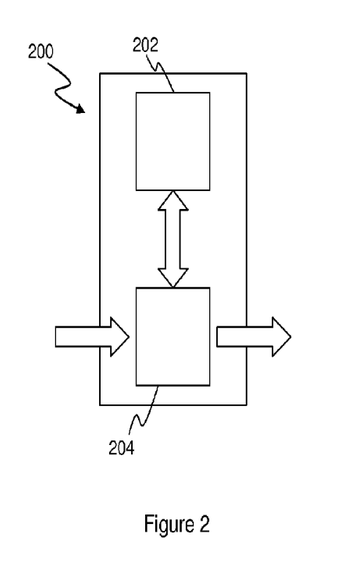
FIG. 2 is a block diagram illustrating a backpropagation equaliser implemented using a digital signal processor, according to an embodiment of the invention.

FIG. 2 is a simplified block diagram illustrating components of a backpropagation equaliser 200 implemented using a digital signal processor (DSP) 202. The DSP is interfaced to at least one memory device 204. The memory device 204 may comprise, for example, one or more blocks of random access memory (RAM), and may also include non-volatile memory, such as read only memory (ROM), containing, for example, program instructions for execution by the DSP 202, and associated static data. In accordance with the simplified block diagram 200, it is envisaged that input signal samples are transferred directly into memory 204 for processing by the DSP 202, and that distortion-mitigated output signal samples are subsequently transferred from the memory 202 for further processing.

It will be appreciated that the block diagram of the backpropagation equaliser 200 shown in FIG. 2 is schematic in nature, and represents only one possible implementation. In a practical implementation based upon this general architecture, it is possible that the DSP 202 and/or memory 204 may be shared with other processing blocks in the receiver of a post-equalisation embodiment 100, or the transmitter of a pre-equalisation embodiment 144. For example, in a post-equalisation embodiment 100 the decoding of the equalised received signal samples (142) may also be performed by DSP 202 directly within the memory 204. Similarly, in a pre-equalisation embodiment 144 the encoding of data for transmission (block 104) may be performed, prior to equalisation, by the DSP 202 directly within the memory 204. In various alternative implementations, additional processors may be provided for encoding/decoding computations, either within corresponding dedicated memory devices, or within shared memory 204. The processors (eg DSP 202) may include a general purpose microprocessors, dedicated DSP integrated circuits, and/or one or more custom, semi-custom or programmable integrated circuit elements configured to perform specific digital computation functions.

For simplicity and clarity of explanation, the operation of the equaliser 200 will be described in detail by reference to an implementation utilising only a single polarisation state for optical transmission, and wherein PMD compensation is not required. This corresponds directly with the transmission of a single input signal sequence (eg 106), wherein PMD is negligible, or where PMD compensation is provided within the optical domain, ie prior to the receiver 122. However, as has previously been noted, PMD compensation is a linear operation that is readily implemented, for example through the use of the well known inverse Jones matrix formalism, within the linear elements of the backpropagation model. Accordingly, adaptation of the below-described implementation to include PMD within the backpropagation model is well within the capabilities of the person having ordinary skill in the relevant art.

Figure 3:
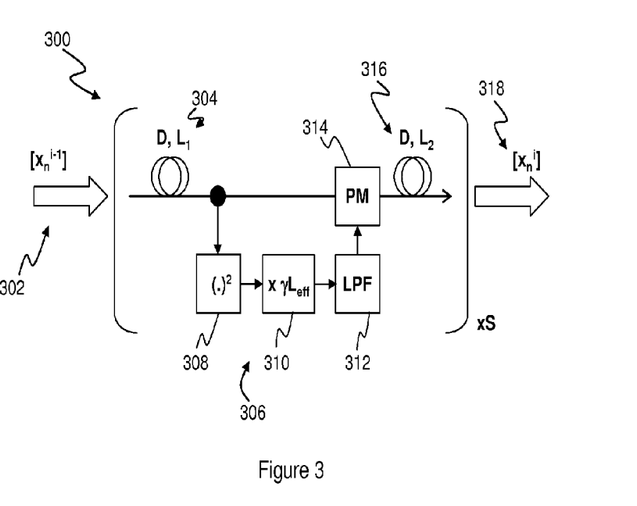
FIG. 3 is a schematic representation of a backpropagation model of an optical fibre link according to a preferred embodiment of the invention.

FIG. 3 is a schematic representation of a backpropagation model 300 implemented by an equaliser 200, according to a preferred embodiment of the invention. A sequence of input digital samples 302, having a predetermined precision and sampling rate in accordance with system design considerations and constraints, provides an initial input to the model 300. The model 300 comprises S (one or more) sequential segments collectively representing an "inverse fibre link". Each sequential segment comprises a first linear backpropagation element 304, a non-linear backpropagation element 306, and an optional second linear backpropagation element 316. The output from each segment of the model provides the input to the next segment, and the output 318 from the final segment comprises a distortion-mitigated sequence of output digital samples. The initial (input) segment of the backpropagation model 300 is associated with the receiving end of the actual transmission link, while the final segment is associated with the transmitting end of the link.

The non-linear backpropagation element 306 comprises a number of processing steps. In particular, a first linear compensated signal sequence is output from the first linear backpropagation element 304, which is subject to non-linear processing by the non-linear backpropagation element 306. In particular, a time domain phase shift function is computed from the first linear compensated signal sequence via operations 308, 310, 312. Operation 308 comprises computing the intensity of the first linear compensated signal, which is proportional to the square of the signal amplitude. The intensity is then scaled by an appropriate factor corresponding with the effective length and non-linear coefficient of the associated fibre link segment, by operation 310. Finally, the operation 312 involves filtering the resulting scaled samples in order to produce a corresponding band-limited sequence. The result of these operations is a filtered intensity dependent function of the first linearly compensated signal, which is applied in operation 314 to modulate the phase of the first linearly compensated signal. The resulting non-linear compensated signal output from phase modulation operation 314 is then optionally processed by second linear backpropagation element 316.

In embodiments in which both first and second linear backpropagation elements 304, 316 are provided, each such element represents a corresponding sub-segment of the associated segment of the fibre transmission link 116. In particular, the total modelled lengths associated with the linear elements 304, 316 is equal to the length of the associated fibre segment, and the relative lengths of the corresponding sub-segments are determined, for example via an optimisation process as described in greater detail below, so as to substantially maximise the degree of mitigation of signal distortion achieved by the equaliser 200. It will be appreciated that a computationally efficient implementation the calculation of propagation through the second linear element 316 in one model segment may be combined with the calculation of propagation through the first linear element 304 of a subsequent model segment, in order to avoid unnecessary duplicated calculations of the forward and inverse Fourier transforms.

In mathematical terms, the operations performed by the first linear element 304, the non-linear element 306 and the second linear element 316 may be represented by the following equations:

$$[y_n^i] = \tilde{F}^{-1}\{\exp(i\theta_n)\tilde{F}([x_n^{i-1}])\}$$

where:

$$\theta_n = DL_1 \frac{\lambda_0^2}{c}(f_n - f_0)^2$$

$$[z_n^i] = \exp(i\phi_n)[y_n^i]$$

where:

$$\phi_n = \gamma L_{eff} \cdot h_{lpf}[n] * [|y_n^i|^2]$$

$$[x_n^i] = \tilde{F}^{-1}\{\exp(i\varphi_n)\tilde{F}([z_n^i])\}$$

where:

$$\varphi_n = DL_2 \frac{\lambda_0^2}{c}(f_n - f_0)^2$$

In the foregoing equations: $\tilde{F}$ and $\tilde{F}^{-1}$ represent the forward and inverse discrete Fourier transforms, respectively; $[x_n^i]$ is the sequence of signal samples input to the $i^{th}$ segment (i= 1 ... S), where $[x_n^0]$ is the input to the equaliser and $[x_n^S]$ is the distortion-mitigated output; $[y_n^i]$ is the output of the first linear element; $[z_n^i]$ is the output of the non-linear element; $h_{lpf}[n]$ is the impulse response of the low pass filter 312, where * denotes convolution; D is the inverse fibre (linear) dispersion; $\lambda_0$ is the centre wavelength of the signal band, and $f_0$ the corresponding frequency; $\gamma$ is the inverse fibre nonlinear coefficient; and $L_{eff}$ is the nonlinear effective length.

FIGS. 4(a) and 4(b) are schematic spectral diagrams that illustrate the manner in which the use of filtering 312 within the non-linear backpropagation elements enables a reduction in the oversampling factor required for implementation of the equaliser 200. In particular, FIG. 4(a) represents the conventional computation of third order non-linear interactions. The spectrum 402 represents components of the transmitted signal, covering a bandwidth of $B_{sig}$. The corresponding (single sided) spectrum of the signal intensity, which is proportional to the square of the signal amplitude, has the form 404, also requiring a corresponding bandwidth $B_{sig}$. The non-linear operation of multiplying the phase of the signal 402 by the intensity 404 results in a modulated signal 406 having a total bandwidth equal to three times $B_{sig}$ due to the resulting intermodulation products 408. Accordingly, the computation of this phase modulated signal within a discrete time digital implementation requires three times oversampling of the signal waveform, in order to avoid aliasing of the high bandwidth intermodulation products 408.

Turning now to FIG. 4(b), the effect of applying the low pass filter 312 to the intensity spectrum 404 is represented by the filter function 410. This reduces the total bandwidth of the phase modulating signal to the filter bandwidth $B_{filt}$. Accordingly, the modulated signal spectrum 412 includes bandwidth limited intermodulation products 414, such that the total bandwidth of the resulting modulated signal is reduced to $B_{sig}+2\times B_{filt}$. The inventors have recognised that while this involves the loss of information relating to the extended intermodulation components 408, the loss of this information will have a relatively small impact on the overall accuracy of the backpropagation computations for links having non-negligible chromatic dispersion. This is because the extended intermodulation products are widely separated in frequency, and accordingly are poorly phase-matched in the presence of chromatic dispersion, such that their impact on further non-linear distortion is relatively small. Similarly, the removal of the higher frequency components of the intensity spectrum 404 also corresponds with an approximation in which higher frequency intensity fluctuations (ie corresponding to wider spaced spectral components of the signal) are neglected, which is reasonable in the presence of non-negligible chromatic dispersion.

In order to assess the impact and effectiveness of the foregoing equalisation methods, including the use of low pass filter 312, and the employment of dual linear compensation elements 304, 316, a number of comparative simulations of transmission and equalisation have been performed, which are described below with reference to FIGS. 5 and 6.

Numerical simulations of a post-compensated system 100 utilising either CO-OFDM or CO-QPSK modulation were conducted using VPIsystems' VPItransmissionMaker™ WDM V8.3. The transmission link 116 consisted of 40×80 km spans of standard single-mode fibre (SMF) (3200 km). The SMF had an attenuation of 0.2 dB/km, dispersion of 16 ps/nm/km and nonlinearity factor of 1.3/km/W. EDFAs with a noise figure of 5 dB were used to compensate for the loss in each span. No DCF was used.

The CO-OFDM transmitter used a 1024-point IFFT, with 880 of the subcarriers modulated with 4-QAM. Ten subcarriers either side of DC and 61 subcarriers either side of the Nyquist frequency were zeroed. Digital-to-Analogue Converters (DAC, 110) operated at 38 Gsample/s. A 128-sample cyclic prefix was used to give a bit rate of 58 Gb/s in a single polarization, which allowed for a 4% overhead for synchronization and training. A DC bias was added to the RF signal to produce a carrier which can be used to compensate for local oscillator (LO) phase noise. This RF signal was then used to drive a complex Mach-Zehnder modulator (MZM) which generated an optical spectrum 33-GHz wide.

The QPSK signal was generated by driving each arm of a complex MZM with a 28-Gb/s pseudorandom bit generator, giving a total bit rate of 56 Gb/s. A 45-GHz optical filter was then used to limit the bandwidth of the generated signal.

A typical coherent homodyne receiver using an optical local oscillator, optical hybrid and two pairs of balanced photodiodes were used. The analog-to-digital converter (ADC, 128 or 130) for the OFDM and QPSK systems operated at 38 Gsample/s and 56 Gsample/s respectively. In order to isolate interactions between chromatic dispersion and fiber nonlinearity, the lasers' phase noise and fibre PMD were set to zero.

In each simulation, a backpropagation equalizer 200 embodying the invention was incorporated at the receiver, ie in a post-equalization configuration 100. Various parameters of the equalizer 200, including filter characteristics and initial dispersion, were optimized using numerical simulations. The table below is the optimal filter bandwidth identified in the optimising simulations, and the optimal equivalent length of fibre in the first linear backpropagation element associated with each equaliser model segment. It will be noted that the optimal filter bandwidth decreases as the number of model segments is decreased, ie as the number of spans compensated by each segment increases. Furthermore, the optimal effective location of the non-linear backpropagation element was found in all cases to be towards the start of a span located near the middle of the equivalent fibre segment.

TABLE 1

Backpropagation model parameters optimized by simulation

| # Steps | spans/step | Optimal filter BW [GHz] | L (1st lin. sec.) [km] |
|---|---|---|---|
| 40 | 1 | 10 | 10 |
| 20 | 2 | 6 | 90 |
| 10 | 4 | 4 | 170 |
| 8 | 5 | 4 | 170 |
| 5 | 8 | 3.5 | 330 |
| 4 | 10 | 3 | 410 |
| 2 | 20 | 1.8 | 810 |
| 1 | 40 | 1 | 1610 |

Figure 5:
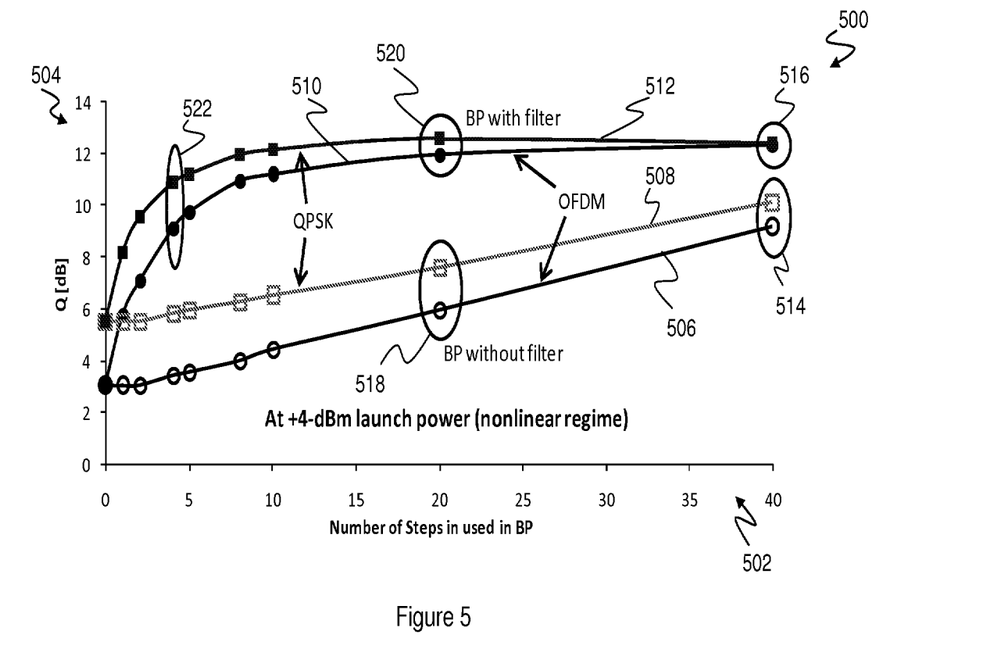
FIG. 5 is a graph comparing received signal quality for backpropagation equalisation with and without non-linear compensation signal filtering as a function of the number of model segments.
Figure 6:
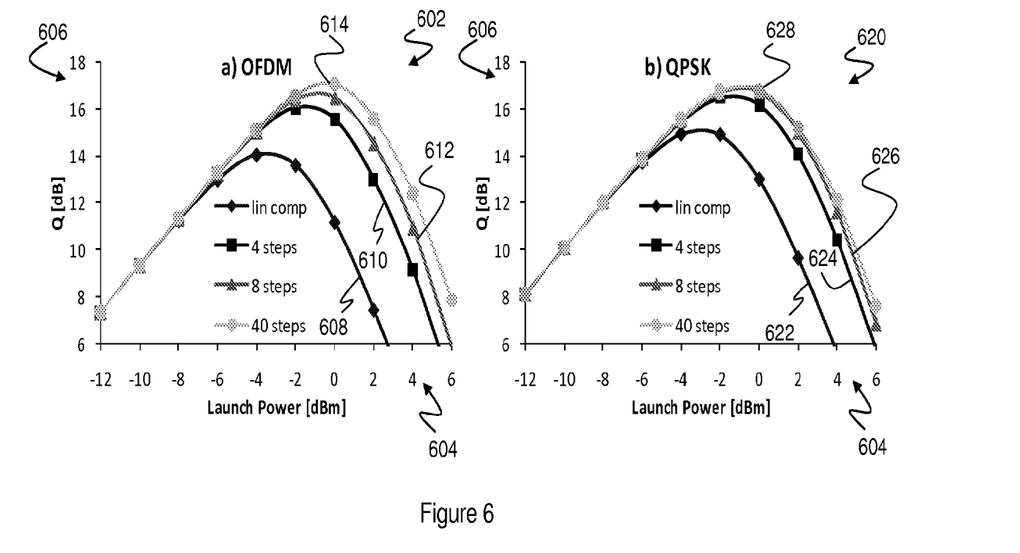
FIGS. 6(a) and 6(b) are graphs comparing received signal quality for backpropagation equalisation methods as a function of span launch power.

FIG. 5 is a graph generated from the numerical simulations comparing received signal quality for backpropagation equalisation with and without non-linear compensation signal filtering, as a function of the number of model segments. More particularly, in the graph 500 the x-axis 502 shows the number of segments used in the backpropagation equaliser 200, while the y-axis 504 is the received signal quality, Q, following backpropagation equalisation. Four curves are shown in the graph 500. The curves 506, 508 are for backpropagation equalisers without low pass filter element 312, while curves 510, 512 result from the use of an equaliser including the low pass filter 312. Results for OFDM modulation are shown by curves 506, 510, while QPSK modulation is shown by curves 508, 512.

In all simulations, the maximum received signal quality Q was achieved by using an equaliser 200 employing 40 segments, ie one segment per fibre span. These best case results are shown by points 514 (without filter 312) and 516 (with filter 312). Notably, inclusion of the filter 312 in a 40 segment equaliser provides an additional 2 dB benefit for CO-QPSK systems, and a 3 dB benefit for CO-OFDM systems, compared with equalisation without filter 312. Furthermore, this benefit is accompanied by a reduction in computational requirements, since the unfiltered system employed a sampling rate that was double that of the filtered system. The systems employing equalisation with filters 312 used the same sampling rate as for a linearly equalised system, ie 1.2 times oversampling for CO-OFDM, and 2 times oversampling for CO-QPSK. Also of note is that with filtering, the same signal quality Q is achieved with 40 segments for both CO-OFDM and CO-QPSK, whereas without filters 312 the received signal quality is higher for CO-QPSK regardless of the number of segments employed in the backpropagation model. Of course, this apparent benefit for CO-QPSK must be weighed against the fact that the transmitted signal bandwidth is higher (56 giga samples per second as compared with 38 Gsamples/s at the transmitter), and that additionally a higher oversampling factor is required in the receiver for CO-QPSK.

A significant further benefit is achieved by the use of filters 312 when the number of segments in the backpropagation model is reduced, ie wherein each segment represents multiple spans of the actual transmission link 116. For example, halving the number of segments (and hence the computational requirements) results in virtually no additional penalty for CO-QPSK, and less than one DB penalty for CO-OFDM, when filters 312 are employed, as indicated by points 520. By comparison, as indicated by points 518, both CO-QPSK and CO-OFDM experience approximately 3-dB reduction in signal quality when filters 312 are not employed in the backpropagation model.

The simulation results suggest that the additional phase noise produced by unfiltered backpropagation equalisation is present even when a single backpropagation step is used for each span, and that this noise increases with the number of spans compensated by each backpropagation step. The majority of these noise products are removed by filtering, thus improving non-linearity compensation and allowing compensation of multiple spans with each backpropagation step. Indeed, with as few as four steps (shown by points 522) the received signal quality using a backpropagation equaliser with filters 312 exceeds that achieved by unfiltered backpropagation using 40 model segments (ie points 514). In combination with the reduction in oversampling factor, it is estimated that the computational cost associated with backpropagation equalisation can be reduced by more than a factor of 10 by the use of equalisers embodying the present invention, even taking into account the additional computational cost of implementation of the filters 312.

In order to assess the benefit provided by embodiments of the invention at optimal operational power, further simulations were conducted in which the power launched into each span was swept from −12 dBm to 6 dBm. FIGS. 6(*a*) and 6(*b*) are graphs 602, 620 showing the results of these simulations. In each case, the x-axis 604 represents the launch power into each span, while the y-axis 606 represents the signal quality, Q. The graph 602 is for a CO-OFDM system, while the graph 620 is for a CO-QPSK system. In each case, curves are shown for linear compensation only (608, 622), and for non-linear equalisation using a backpropagation equaliser employing four segments (610, 624), eight segments (612, 626) and forty segments (614, 628). The results clearly show that the use of a backpropagation equaliser embodying the present invention enables the use of higher launch powers, in order to obtain higher signal quality Q at the receiver. Furthermore, the majority of this benefit can be achieved with an equaliser 200 which employs a number of model segments that is a small fraction of the total number of spans within the transmission link. For example, the CO-OFDM system achieves a peak quality Q of 17 dB using a 40-segment backpropagation equaliser, which was reduced by only 1 dB with a four segment equaliser. This compares with a maximum received signal quality Q of 14 dB using linear equalisation only. For the CO-QPSK system a received signal quality Q of 16.5 dB was achieved using an equaliser employing four model segments, compared with a maximum quality Q of 15 dB using linear equalisation only. For CO-QPSK, increasing the number of model segments in the equaliser to forty results in only a 0.3 dB further improvement in received signal quality.

In summary, embodiments of the present invention employing backpropagation equalisers having first and second linear elements 304, 316 disposed either side of a non-linear element 306 including a compensation bandwidth limiting filter 312 are able to significantly reduce the computational complexity of backpropagation equalisation, while also enabling improved compensation of combined linear and non-linear distortions. The reductions in computational complexity result from both a reduction in required sampling rate, and a reduction in the number of backpropagation model segments.

While preferred embodiments of the invention have been described herein, many variations will be apparent in view of the foregoing discussion, and it will therefore be appreciated that the invention is not to be limited to these specific embodiments. Rather, the scope of the invention is as defined by the claims appended hereto.

The invention claimed is:

1. An optical signal equalisation method comprising:
    receiving, at a signal processing unit, an input sequence of digital signal samples corresponding with an optical signal transmitted via an optical fibre link from a transmitter to a receiver; and
    the signal processing unit processing the input sequence of digital signal samples to compute a distortion-mitigated sequence of output digital signal samples, said processing comprising, for each one of a plurality of segments of the optical fibre link proceeding sequentially from an initial segment associated with the receiver to a final segment associated with the transmitter:
        computing a first linear compensated signal by processing a segment input signal using a first linear backpropagation computational model of the segment;
        computing a nonlinear compensated signal by processing the first linear compensated signal using a nonlinear backpropagation computational model of the segment according to which a nonlinear compensation signal having a predetermined bandwidth limitation is computed and applied to the first linear compensated signal; and
        providing a segment output signal based upon the nonlinear compensated signal, outputting the distortion-mitigated sequence of output digital signal samples,
    wherein the segment input signal of the initial segment comprises the input sequence of digital signal samples, the segment input signal of each subsequent segment comprises the preceding segment output signal, and
    the distortion-mitigated sequence of digital signal samples comprises the segment output signal of the final segment.

2. The method of claim 1 wherein the first linear backpropagation computational model and the nonlinear backpropagation computational model of each segment of the plurality of segments are characterised, at least in part, by inverse propagation parameters of the segment.

3. The method of claim 2 wherein the inverse propagation parameters of the first linear backpropagation computational model of each segment of the plurality of segments comprise an inverse dispersion parameter which is substantially equal in magnitude and opposite in sign to a corresponding dispersion parameter of the segment, and a length parameter that is substantially equal to a length of the segment.

4. The method of claim 2 wherein the inverse propagation parameters of the nonlinear backpropagation computational model of each segment of the plurality of segments comprise an inverse non-linear coefficient which is substantially equal in magnitude and opposite in sign to a corresponding non-linear coefficient of the segment, and an effective length parameter that is less than a length of the segment.

5. The method of claim 2 further comprising the step of optimising one or more of the inverse propagation parameters of the first linear backpropagation computational model and the nonlinear backpropagation computational model of each segment of the plurality of segments such that a measure of received signal quality is maximised.

6. The method of claim 5 wherein the step of optimizing comprises online measurement of received signal quality using transmitted training sequences of known information bits.

7. The method of claim 5 wherein the step of optimising comprises simulation of the optical link and backpropagation model.

8. The method of claim 1 wherein computing the first linear compensated signal for each segment of the plurality of segment comprises:
  computing a Fourier transform of the signal input to the segment to produce a transformed input signal;
  applying a frequency-dependent phase shift to the transformed signal to produce a transformed output signal; and
  computing an inverse Fourier transform of the transformed output signal to produce the first linear compensated signal.

9. The method of claim 1 wherein computing the nonlinear compensated signal for each segment of the plurality of segments comprises:
  determining a phase shift function comprising a filtered intensity dependent function of the first linearly compensated signal, wherein a bandwidth of said filtering corresponds with the associated compensation bandwidth; and
  applying a time dependent phase shift to the first linearly compensated signal in accordance with the phase shift function, to produce the non-linear compensated signal.

10. The method of claim 1 wherein the step of the signal processing unit processing the sequence of digital signal samples further comprises:
  computing a second linear compensated signal by processing the nonlinear compensated signal using a second linear backpropagation computational model, wherein the first and second linear backpropagation computational models are configured to model respective first and second subsegments of the segment, the sum of the lengths of said first and second sub-segments being equal to the length of the segment,
  wherein a relative length of each of said first and second sub-segments is determined so as to substantially maximise a degree of mitigation of signal distortion, and
  wherein the segment output signal comprises the second linear compensated signal.

11. An equaliser for equalisation of a signal transmitted via an optical fibre link from a transmitter to a corresponding receiver, comprising:
  a digital signal processor; and
  at least one memory device operatively associated with the digital signal processor, wherein:
  the memory device contains parameters defining a backpropagation computational model of the optical fibre link, said backpropagation computational model comprising a plurality of sequential model segments of the optical fibre link, wherein an initial segment is associated with the receiver and a final segment is associated with the transmitter, wherein each model segment comprises a first linear backpropagation computational model and a nonlinear backpropagation computational model; and
  the digital signal processor is configured to:
  receive an input sequence of digital signal samples having a predetermined precision and sampling rate; and
  process the input sequence of digital signal samples to compute a distortion-mitigated sequence of output digital signal samples from the input digital samples, said processing comprising, for each one of the plurality of sequential model segments of the optical fibre link proceeding from the initial segment to the final segment:
  computing a first linear compensated signal by processing a segment input signal using a first linear back-propagation computational model of the segment;
  computing a nonlinear compensated signal by processing the first linear compensated signal using a nonlinear backpropagation computational model of the segment according to which a nonlinear compensation signal having a predetermined bandwidth limitation is computed and applied to the first linear compensated signal;
  providing a segment output signal based upon the nonlinear compensated signal; and
  outputting the distortion-mitigated sequence of output digital signal samples,
  wherein the segment input signal of the initial segment comprises the input sequence of digital signal samples, the segment input signal of each subsequent comprises the preceding segment output signal, and
  wherein the distortion-mitigated sequence of digital signal samples comprises the segment output signal of the final segment.

12. The equaliser of claim 11 wherein each model segment further includes a second linear backpropagation computational model wherein the first and second linear backpropagation computational models are configured to model respective first and second sub-segments of the segment, the sum of the lengths of said first and second sub-segments being equal to the length of the segment,
  wherein a relative length of each of said first and second sub-segments is determined so as to substantially maximise a degree of mitigation of signal distortion, and
  wherein the segment output signal comprises the second linear compensated signal.

13. A receiving apparatus for performing post-equalisation of a received optical signal, in order to mitigate distortions of the optical signal in traversing an optical fibre link from a corresponding transmitter, the receiving apparatus comprising:
  a coherent optical receiver operatively associated with a receiving end of the optical fibre link, and configured to convert a received optical signal to a corresponding received electrical signal;
  at least one analogue to digital converter operatively associated with a corresponding output of the coherent optical receiver, and configured to convert the received electrical signal to a corresponding sequence of input digital samples having a predetermined precision and sampling rate; and
  an equaliser according to claim 11, wherein the equaliser is operatively interfaced to an output of the analogue to digital converter, such that the digital signal processor is configured to receive the sequence of input digital samples from the analogue to digital converter.

14. A transmitting apparatus for pre-equalisation of a signal so as to mitigate distortions of the signal in traversing an optical fibre link to a corresponding receiver, the transmitting apparatus comprising:
  a signal source generating a sequence of input digital samples having a predetermined precision and sampling rate;
  an equaliser according to claim 11, wherein the equaliser is operatively interfaced to the signal source such that the digital signal processor is configured to receive the sequence of input digital samples from the signal source;
  at least one digital to analogue converter operatively interfaced to the equaliser and configured to convert the distortion mitigated sequence of output digital samples from the equaliser to a corresponding transmitted electrical signal; and an optical transmitter operatively interfaced to the digital to analogue converter and configured to modulate the transmitted electrical signal onto an optical carrier for transmission via the optical fibre link.

15. An optical signal equalisation method comprising:

receiving, at a signal processing unit, an input sequence of digital signal samples corresponding with an optical signal transmitted via an optical fibre link from a transmitter to a receiver; and the signal processing unit processing the input sequence of digital signal samples to compute a distortion-mitigated sequence of output digital signal samples, said processing comprising, for each one of a plurality of segments of the optical fibre link proceeding sequentially from an initial segment associated with the receiver to a final segment associated with the transmitter:

computing a first linear compensated signal by processing a segment input signal using a first linear backpropagation computational model of the segment;

computing a nonlinear compensated signal by processing the first linear compensated signal using a nonlinear backpropagation computational model of the segment;

computing a second linear compensated signal by processing the nonlinear compensated signal using a second linear backpropagation computational model of the segment;

providing a segment output signal based upon the second linear compensated signal; and outputting the distortion-mitigated sequence of output digital signal samples, wherein:

the first and second linear backpropagation computational models are configured to model respective first and second sub-segments of the segment, the sum of the lengths of said first and second sub-segments being equal to the length of the segment, a relative length of each of said first and second sub-segments is determined so as to substantially maximise a degree of mitigation of signal distortion, the segment input signal of the initial segment comprises the input sequence of digital signal samples, the segment input signal of each subsequent segment comprises the preceding segment output signal, and the distortion-mitigated sequence of digital signal samples comprises the segment output signal of the final segment.

16. The method of claim 15 wherein the non-linear backpropagation model of each segment of the plurality of segments comprises a predetermined bandwidth limitation, and computing the non-linear compensated signal comprises:

computing a nonlinear compensation signal from the first linear compensated signal;

limiting a bandwidth of the nonlinear compensation signal in accordance with the associated compensation bandwidth; and applying the bandwidth-limited nonlinear compensation signal to the first linear compensated signal.

\* \* \* \* \*